N. WATERMAN.
Portable Steam Cooking Apparatus.
No. 5,675.  Patented July 18, 1848.
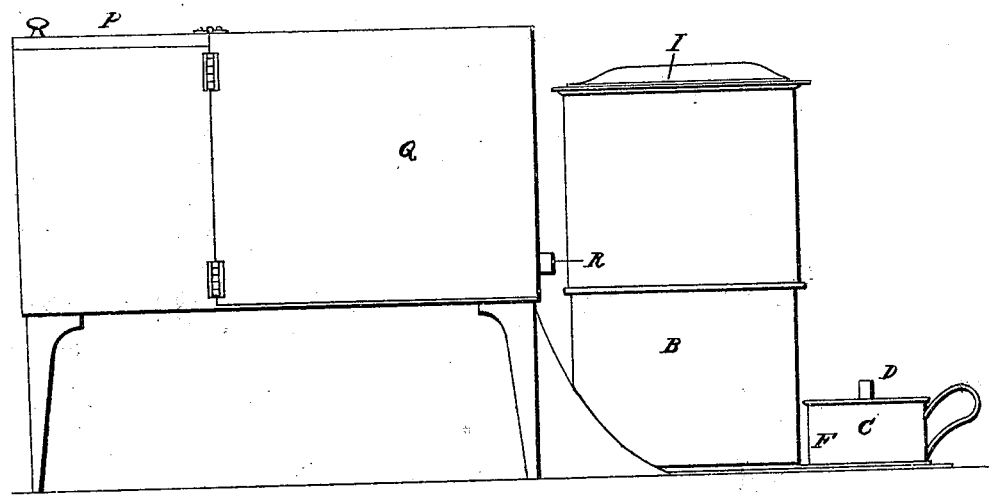
Fig. 1.
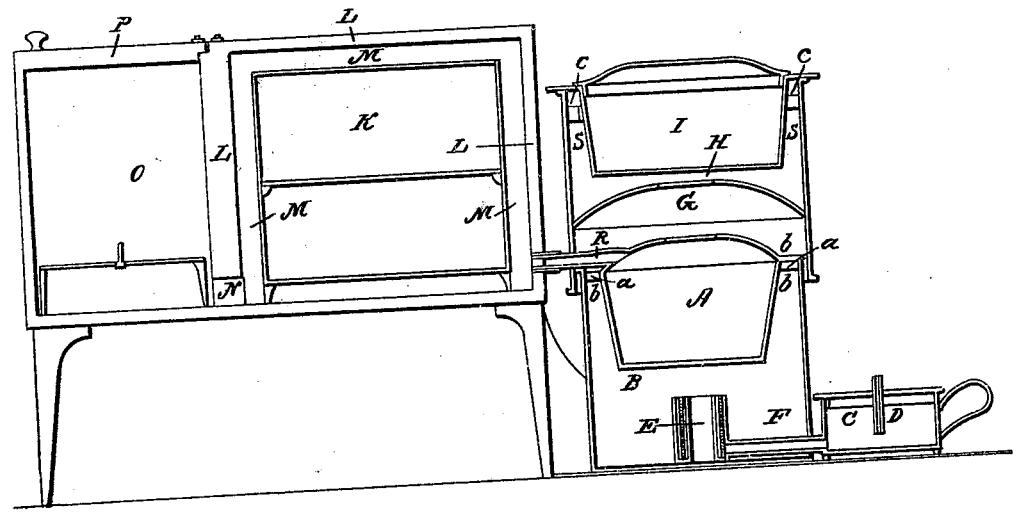
Fig. 2. Section.

UNITED STATES PATENT OFFICE.

NATHANIEL WATERMAN, OF BOSTON, MASSACHUSETTS.

PORTABLE COOKING-STOVE.

Specification of Letters Patent No. 5,675, dated July 18, 1848.

*To all whom it may concern:*

Be it known that I, NATHANIEL WATERMAN, of Boston, in the county of Suffolk and State of Massachusetts, have invented a new and Portable Apparatus for Cooking by Steam and With Great Economy; and I do hereby declare that the same is fully described and represented in the following specification and accompanying drawings, letters, figures, and references thereof.

Of said drawings Figure 1 exhibits an external side elevation of my said portable steam cooking apparatus, and Fig. 2 is a vertical, central, and longitudinal section of the same.

In said figures, A represents a steam boiler or generator, arranged and supported within a cylindrical case or fire chamber B.

C is an ordinary spirit lamp, made with one wick tube D, extending down through its top. It also has an Argand burner E, connected to it by means of a tube F, the said Argand burner being made to carry a large sized wick, for the purpose of generating a large amount of flame when lighted. The object of making the lamp in this manner is to enable a person to boil with flame from the large Argand burner, and after water in the boiler has been brought to a boiling temperature to reverse the lamp, or in other words turn it around so as to bring the small wick of the tube D, underneath the boiler, which will give sufficient flame and heat to keep the water above a boiling temperature. Directly over the steam generator I arrange what I term the concentrating and distributing frustrum or arch G. It is shaped and disposed as seen in the drawings and has an orifice H, on its upper and central part. The steam generator is supported on any suitable number of studs *a*, *a*, extending from the inner surface of the case B, there being a space *b*, *b*, left or made between the upper part of the generator and the case B, for the purpose of allowing the smoke and heat from the spirit lamp to pass up over the top of the generator and between it and the concentrating and distributing frustrums, G. After thus passing in contact with the top of the generator the heat rushes through the orifice H, and impinges directly against the water vessel I, arranged over the frustrum G. From thence it passes laterally in all directions, and upward against the sides of the vessel I, or through the chamber S, S, in which the same is suspended, and is made to escape out of a space *c*, *c*, made between the case B, and the upper part of the said vessel. Water or any other liquid being put in the vessel I, may be kept warm by the surplus heat which escapes from the fire chamber of the main generator.

K is an oven made of tinned iron and surrounded entirely with the exception of one side in which is the door Q, by an external box or casing L, which should be made of a size sufficient to cause the oven to be inclosed within a steam space M, M, &c., extending entirely around the top, bottom, both ends, and one side of it. The said steam space should open (as seen at N,) into a steam box or chamber O, placed at one end of the chamber L, and having a lid or cover P, as seen in the drawings. The generator communicates with the steam space by a pipe R.

I do not intend to use the oven for baking, but simply for warming or heating bread, or any other matter which may be placed within it. The steam chamber O, is for the purpose of steaming potatoes or other vegetables.

The above described apparatus will be found to be exceedingly useful and economical, for by the combustion of a very small quantity of alcohol (say about 2 or 3 cents worth) tea or coffee can be made, bread can be warmed, and potatoes cooked, and eggs boiled sufficient for a breakfast of an individual or a small family of persons. By it not only a great saving of fuel may be effected, but the cooking operations may be performed with great expedition and without the usual accumulation of ashes, such as would be produced by a wood or coal fire.

Having thus described my invention, that which I claim therein is as follows, viz:

1. I claim the combination of the Argand burner with the small tube wick lamp in the manner and for the purpose as above specified.

2. I also claim the combination of the concentrating and distributing frustrum G, with the upper and lower boiling chambers of the case B, in such manner as to carry the heat in contact with the top of the lower boiling vessel and the bottom of the upper boiler or vessel as specified.

In testimony whereof I have hereto set my signature, this fifth day of November, A. D. 1847.

NATHL. WATERMAN.

Witnesses:
R. H. EDDY,
F. GOULD.